US012567171B2

(12) United States Patent 
Zhang et al.

(10) Patent No.: US 12,567,171 B2 
(45) Date of Patent: Mar. 3, 2026

(54) THREE-DIMENSIONAL OBJECT DETECTION

(71) Applicant: Microsoft Technology Licensing, LLC, Redmond, WA (US)

(72) Inventors: Zheng Zhang, San Carlos, CA (US); Han Hu, Beijing (CN); Yue Cao, Redmond, WA (US); Xin Tong, Beijing (CN); Ze Liu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 297 days.

(21) Appl. No.: 18/274,679

(22) PCT Filed: Feb. 8, 2022

(86) PCT No.: PCT/US2022/015544 
§ 371 (c)(1), 
(2) Date: Jul. 27, 2023

(87) PCT Pub. No.: WO2022/182506 
PCT Pub. Date: Sep. 1, 2022

(65) Prior Publication Data 
US 2024/0135576 A1 Apr. 25, 2024

(30) Foreign Application Priority Data

Feb. 25, 2021 (CN) .......................... 202110212544.4

(51) Int. Cl. 
*G06T 7/246* (2017.01) 
*G06N 3/04* (2023.01) 
(Continued)

(52) U.S. Cl. 
CPC .................. *G06T 7/73* (2017.01); *G06T 7/62* (2017.01); *G06T 7/90* (2017.01); *G06T 17/00* (2013.01); 
(Continued)

(58) Field of Classification Search 
CPC ............. G06T 7/73; G06N 3/08; G06V 10/25 
See application file for complete search history.

(56) References Cited

U.S. PATENT DOCUMENTS 9,098,773 B2 8/2015 Huang et al. 
9,476,730 B2 10/2016 Samarasekera et al. 
(Continued)

FOREIGN PATENT DOCUMENTS

CN 109165667 A 1/2019 
CN 110245709 A 9/2019 
(Continued)

OTHER PUBLICATIONS

Atzmon, et al., "Point Convolutional Neural Networks by Extension Operators", In Repository of arXiv:1803.10091v1, Mar. 27, 2018, 14 Pages.

(Continued)

*Primary Examiner* — Jayanti K Patel 
(74) *Attorney, Agent, or Firm* — Schwegman Lundberg & Woessner, P.A.

(57) ABSTRACT

According to implementations of the subject matter described herein, a solution is proposed for three-dimensional (3D) object detection. In this solution, feature representations of a plurality of points are extracted from point cloud data related to a 3D object. Initial feature representations of a set of candidate 3D objects are determined based on the feature representations of the plurality of points. Based on the feature representations of the plurality of points and the initial feature representations of the set of candidate 3D objects, a detection result for the 3D object is generated by determining self-correlations between the set of candidate 3D objects and cross-correlations between the plurality of points and the set of candidate 3D objects. In this way, without grouping points into candidate 3D objects, the (Continued)

3D object in a 3D scene can be localized and recognized based on the self-correlations and cross-correlations.

11 Claims, 5 Drawing Sheets

(51) Int. Cl.
| | |
|---|---|
| *G06T 7/238* | (2017.01) |
| *G06T 7/62* | (2017.01) |
| *G06T 7/73* | (2017.01) |
| *G06T 7/90* | (2017.01) |
| *G06T 17/00* | (2006.01) |
| *G06V 10/44* | (2022.01) |
| *G06V 20/64* | (2022.01) |

(52) U.S. Cl.
CPC ............... *G06V 10/44* (2022.01); *G06V 20/64* (2022.01); *G06V 2201/07* (2022.01)

(56) References Cited

U.S. PATENT DOCUMENTS

| | | | | |
|---|---|---|---|---|
| 10,824,862 | B2 | 11/2020 | Qi et al. | |
| 2010/0209013 | A1* | 8/2010 | Minear | G06T 7/32 |
| | | | | 382/294 |
| 2013/0016379 | A1* | 1/2013 | Lou | B42D 15/00 |
| | | | | 358/1.9 |
| 2014/0112536 | A1* | 4/2014 | Ely | G06T 15/60 |
| | | | | 382/103 |
| 2014/0347475 | A1* | 11/2014 | Divakaran | G06V 20/52 |
| | | | | 348/135 |
| 2015/0269438 | A1* | 9/2015 | Samarasekera | G06F 18/24 |
| | | | | 382/154 |
| 2016/0343169 | A1* | 11/2016 | Mullins | G01S 17/89 |
| 2016/0371884 | A1* | 12/2016 | Benko | G06T 19/006 |
| 2019/0170510 | A1* | 6/2019 | Robinson | G01C 9/00 |
| 2020/0042834 | A1* | 2/2020 | Distler | G06V 20/653 |
| 2020/0160559 | A1 | 5/2020 | Urtasun et al. | |
| 2020/0368616 | A1* | 11/2020 | Delamont | H04N 13/239 |

FOREIGN PATENT DOCUMENTS

| | | | | | |
|---|---|---|---|---|---|
| CN | 110322453 | A | 10/2019 | | |
| CN | 111259142 | A | 6/2020 | | |
| CN | 111340766 | A | 6/2020 | | |
| CN | 111860666 | A | 10/2020 | | |
| EP | 2209091 | A1 * | 7/2010 | ............. | G06T 7/254 |
| WO | WO-2012020696 | A1 * | 2/2012 | ............. | G06T 17/10 |
| WO | 2018199958 | A1 | 11/2018 | | |

OTHER PUBLICATIONS

Carion, et al., "End-to-End Object Detection with Transformers", In Repository of arXiv:2005.12872v1, May 26, 2020, 26 Pages.
Chen, et al., "A Hierarchical Graph Network for 3D Object Detection on Point Clouds", In Proceedings of the IEEE/CVF Conference on Computer Vision and Pattern Recognition, Jun. 13, 2020, pp. 392-401.
Chen, et al., "Multi-View 3D Object Detection Network for Autonomous Driving", In Proceedings of the IEEE Conference on Computer Vision and Pattern Recognition, Jul. 21, 2017, pp. 1907-1915.
Chi, et al., "RelationNet++: Bridging Visual Representations for Object Detection via Transformer Decoder", In Repository of arXiv:2010.15831v1, Oct. 29, 2020, 11 Pages.
Dai, et al., "ScanNet: Richly-annotated 3D Reconstructions of Indoor Scenes", In Proceedings of the IEEE Conference on Computer Vision and Pattern Recognition, Jul. 21, 2017, pp. 5828-5839.
Devlin, et al., "BERT: Pre-training of Deep Bidirectional Transformers for Language Understanding", In Repository of arXiv:1810.04805v1, Oct. 11, 2018, 14 Pages.

Engel, et al., "Point Transformer", In Repository of arXiv:2011.00931v1, Nov. 2, 2020, pp. 1-26.
Feng, et al., "GVCNN: Group-View Convolutional Neural Networks for 3D Shape Recognition", In Proceedings of the IEEE Conference on Computer Vision and Pattern Recognition, Jun. 18, 2018, pp. 264-272.
Gu, et al., "Learning Region Features for Object Detection", In Proceedings of the European Conference on Computer Vision, Sep. 8, 2018, 15 Pages.
Guo, et al., "Deep Learning for 3D Point Clouds: A Survey", In Journal of IEEE transactions on Pattern Analysis and Machine Intelligence, vol. 43, Issue 12, Jun. 29, 2020, 27 Pages.
Guo, et al., "Multi-View 3D Object Retrieval With Deep Embedding Network", In Journal of IEEE Transactions on Image Processing, vol. 25, Issue 12, Sep. 15, 2016, pp. 5526-5537.
Hu, et al., "Local Relation Networks for Image Recognition", In Proceedings of the IEEE/CVF International Conference on Computer Vision, Oct. 27, 2019, pp. 3464-3473.
Hu, et al., "Relation networks for object detection", In Proceedings of the IEEE Conference on Computer Vision and Pattern Recognition, Jun. 18, 2018, pp. 3588-3597.
Jampani, et al., "Learning Sparse High Dimensional Filters: Image Filtering, Dense CRFs and Bilateral Neural Networks", In Proceedings of the IEEE Conference on Computer Vision and Pattern Recognition, Jun. 27, 2016, pp. 4452-4461.
Ku, et al., "Joint 3D Proposal Generation and Object Detection from View Aggregation", In Proceedings of the IEEE/RSJ International Conference on Intelligent Robots and Systems, Oct. 1, 2018, pp. 5750-5757.
Liang, et al., "Deep Continuous Fusion for Multi-Sensor 3D Object Detection", In Proceedings of the European conference on computer vision, Sep. 8, 2018, 16 Pages.
Liu, et al., "A Closer Look at Local Aggregation Operators in Point Cloud Analysis", In Repository of arXiv:2007.01294v1, Jul. 2, 2020, 26 Pages.
Liu, et al., "Group-Free 3D Object Detection via Transformers", In Repository of arXiv:2104.00678v2, Apr. 23, 2021, 14 Pages.
Liu, et al., "RoBERTa: A Robustly Optimized BERT Pretraining Approach", In Repository of arXiv:1907.11692v1, Jul. 26, 2019, 13 Pages.
Maturana, et al., "VoxNet: A 3D Convolutional Neural Network for Real-Time Object Recognition", In Proceedings of the IEEE/RSJ International Conference on Intelligent Robots and Systems, Sep. 28, 2015, pp. 922-928.
Mazur, et al., "Cloud Transformers", In Repository of arXiv:2007.11679v2, Dec. 9, 2020, 15 Pages.
Paigwar, et al., "Attentional PointNet for 3D-Object Detection in Point Clouds", In Proceedings the IEEE/CVF Conference on Computer Vision and Pattern Recognition, Jun. 16, 2019, 10 Pages.
Pan, et al., "3D Object Detection with Pointformerx", In Repository of arXiv:2012.11409v1, Dec. 21, 2020, 13 Pages.
"International Search Report and Written Opinion Issued in PCT Application No. PCT/US22/015544", Mailed Date: May 24, 2022, 18 Pages.
Qi, et al., "Deep Hough Voting for 3D Object Detection in Point Clouds", In Proceedings of the IEEE International Conference on Computer Vision, Oct. 27, 2019, pp. 9277-9286.
Qi, et al., "Frustum PointNets for 3D Object Detection from RGB-D Data", In Proceedings of the IEEE Conference on Computer Vision and Pattern Recognition, Jun. 18, 2018, pp. 918-927.
Qi, et al., "ImVoteNet: Boosting 3D Object Detection in Point Clouds with Image Votes", In Proceedings of the IEEE/CVF Conference on Computer Vision and Pattern Recognition, Jun. 13, 2020, pp. 4404-4413.
Qi, et al., "PointNet: Deep Learning on Point Sets for 3D Classification and Segmentation", In Proceedings of the IEEE Conference on Computer Vision and Pattern Recognition, Jul. 21, 2017, pp. 652-660.
Qi, et al., "PointNet++: Deep Hierarchical Feature Learning on Point Sets in a Metric Space", In Proceedings of the 31st Conference on Neural Information Processing Systems, Dec. 4, 2017, 10 Pages.

(56) References Cited

OTHER PUBLICATIONS

Qi, et al., "Volumetric and Multi-View CNNs for Object Classification on 3D Data", In Proceedings of the IEEE Conference on Computer Vision and Pattern Recognition, Jun. 27, 2016, pp. 5648-5656.

Ramachandran, et al., "Stand-Alone Self-Attention in Vision Models", In Repository of arXiv:1906.05909v1, Jun. 13, 2019, 15 Pages.

Shajahan, et al., "Point Transformer for Shape Classification and Retrieval of 3D and Urban Roof Point Clouds", In Repository of arXiv:2011.03921v2, Feb. 20, 2021, 6 Pages.

Shen, et al., "Mining Point Cloud Local Structures by Kernel Correlation and Graph Pooling", In Proceedings of the IEEE Conference on Computer Vision and Pattern Recognition, Jun. 18, 2018, pp. 4548-4557.

Shi, et al., "PointRCNN: 3D Object Proposal Generation and Detection from Point Cloud", In Proceedings of the IEEE Conference on Computer Vision and Pattern Recognition, Jun. 15, 2019, pp. 770-779.

Shi, et al., "PV-RCNN: Point-Voxel Feature Set Abstraction for 3D Object Detection", In Proceedings of the IEEE/CVF Conference on Computer Vision and Pattern Recognition, Jun. 13, 2020, pp. 10529-10538.

Song, et al., "Deep Sliding Shapes for Amodal 3D Object Detection in RGB-D Images", In Proceedings of the IEEE Conference on Computer Vision and Pattern Recognition, Jun. 27, 2016, pp. 808-816.

Song, et al., "SUN RGB-D: A RGB-D Scene Understanding Benchmark Suite", In Proceedings of the IEEE coConference on Computer Vision and Pattern Recognition, Jun. 7, 2015, pp. 567-576.

Su, et al., "Multi-view Convolutional Neural Networks for 3D Shape Recognition", In Proceedings of the IEEE international Conference on Computer Vision and Pattern Recognition, Dec. 7, 2015, pp. 945-953.

Tatarchenko, et al., "Octree Generating Networks: Efficient Convolutional Architectures for High-resolution 3D Outputs", In Proceedings of the IEEE International Conference on Computer Vision, Oct. 22, 2017, pp. 2088-2096.

Te, et al., "RGCNN: Regularized Graph CNN for Point Cloud Segmentation", In Proceedings of the CM Multimedia Conference on Multimedia Conference, Oct. 22, 2018, pp. 746-754.

Thomas, et al., "KPConv: Flexible and Deformable Convolution for Point Clouds", In Proceedings of the IEEE International Conference on Computer Vision, Oct. 27, 2019, pp. 6411-6420.

Vaswani, et al., "Attention is All You Need", In Proceedings of 31st Conference on Neural Information Processing Systems, Dec. 4, 2017, 11 Pages.

Wang, et al., "Adaptive O-CNN: A Patch-based Deep Representation of 3D Shapes", In Journal of ACM Transactions on Graphics, vol. 37, Issue 6, Nov. 2018, 11 Pages.

Wang, et al., "Local Spectral Graph Convolution for Point Set Feature Learning", In Proceedings of the European Conference on Computer Vision, Sep. 8, 2018, 15 Pages.

Wang, et al., "Non-local Neural Networks", In Proceedings of the IEEE Conference on Computer Vision and Pattern Recognition, Jun. 18, 2018, pp. 7794-7803.

Wang, et al., "O-CNN: Octree-based Convolutional Neural Networks for 3D Shape Analysis", In Journal of ACM Transactions on Graphics, vol. 36, Issue 4, Jul. 20, 2017, 11 Pages.

Wu, et al., "3D ShapeNets: A Deep Representation for Volumetric Shapes", In Proceedings of the IEEE Conference on Computer Vision and Pattern Recognition, Jun. 7, 2015, pp. 1912-1920.

Xie, et al., "MLCVNet: Multi-Level Context VoteNet for 3D Object Detection", In Proceedings of the IEEE Conference on Computer Vision and Pattern Recognition, Jun. 13, 2020, pp. 10447-10456.

Xu, et al., "Multi-Level Fusion based 3D Object Detection from Monocular Images", In Proceedings of the IEEE Conference on Computer Vision and Pattern Recognition, Jun. 18, 2018, pp. 2345-2353.

Xu, et al., "SpiderCNN: Deep Learning on Point Sets with Parameterized Convolutional Filters", In Proceedings of the European Conference on Computer Vision, Sep. 8, 2018, pp. 87-102.

Yang, et al., "PIXOR: Realtime 3D Object Detection from Point Clouds", In Proceedings of the IEEE conference on Computer Vision and Pattern Recognition, Jun. 18, 2018, pp. 7652-7660.

Yang, et al., "AttPNet: Attention-Based Deep Neural Network for 3D Point Set Analysis", In Journal of Sensors, vol. 20, Sep. 23, 2020, 20 Pages.

Groh, et al., "Flex-Convolution Million-Scale Point-Cloud Learning Beyond Grid-Worlds", In Proceedings of Asian Conference on Computer Vision, Dec. 2, 2018, pp. 105-122.

Zhang, et al., "H3DNet: 3D Object Detection Using Hybrid Geometric Primitives", In Repository of arXiv:2006.05682v1, Jun. 10, 2020, 28 Pages.

Zhao, et al., "Point Transformer", In Repository of arXiv:2012.09164v1, Dec. 16, 2020, 10 Pages.

Zhou, et al., "Learning Deep Features for Scene Recognition using Places Database", In Journal of Advances in neural information processing systems, vol. 27, Dec. 8, 2014, 9 Pages.

Zhou, et al., "VoxelNet: End-to-End Learning for Point Cloud Based 3D Object Detection", In Proceedings of the IEEE Conference on Computer Vision and Pattern Recognition, Jun. 18, 2018, pp. 4490-4499.

Notice of Allowance Received for Chinese Application No. 202110212544.4, mailed on Apr. 1, 2025, 04 Pages (English Translation Provided).

Second Office Action Received for Chinese Application No. 202110212544.4, mailed on Dec. 30, 2024, 07 pages (English Translation Provided).

Engel, et al., "Point Transformer," IEEE Access, vol. 9, 2021, pp. 1-15.

First Office Action Received for Chinese Application No. 202110212544.4, mailed on Jun. 28, 2024, 15 pages (English Translation Provided).

Jisheng, et al., "3D Model Recognition and Segmentation Based on Multi-Feature Fusion," Journal of Xidian University, vol. 47, No. 4, Aug. 2020, pp. 1-9.

Third Office Action Received for Chinese Application No. 202110247301.4, mailed on Mar. 31, 2025, 15 pages (English Translation Provided).

* cited by examiner

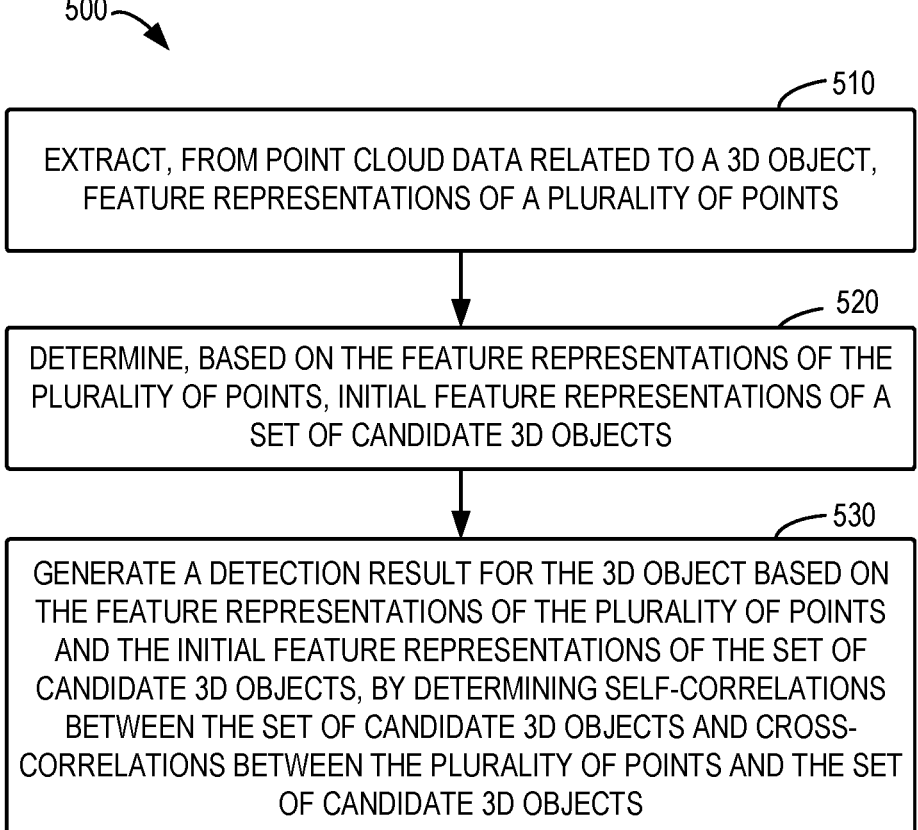

500

510

EXTRACT, FROM POINT CLOUD DATA RELATED TO A 3D OBJECT, FEATURE REPRESENTATIONS OF A PLURALITY OF POINTS

520

DETERMINE, BASED ON THE FEATURE REPRESENTATIONS OF THE PLURALITY OF POINTS, INITIAL FEATURE REPRESENTATIONS OF A SET OF CANDIDATE 3D OBJECTS

530

GENERATE A DETECTION RESULT FOR THE 3D OBJECT BASED ON THE FEATURE REPRESENTATIONS OF THE PLURALITY OF POINTS AND THE INITIAL FEATURE REPRESENTATIONS OF THE SET OF CANDIDATE 3D OBJECTS, BY DETERMINING SELF-CORRELATIONS BETWEEN THE SET OF CANDIDATE 3D OBJECTS AND CROSS-CORRELATIONS BETWEEN THE PLURALITY OF POINTS AND THE SET OF CANDIDATE 3D OBJECTS

FIG. 5

THREE-DIMENSIONAL OBJECT DETECTION

This application is a U.S. national stage filing under 35 U.S.C. § 371 from International Application No. PCT/US2022/015544, filed on Feb. 8, 2022, and published as WO 2022/182506 on Sep. 1, 2022, which claims the benefit of priority to Chinese Patent Application No. 202110212544.4, filed Feb. 25, 2021, which applications and publication are incorporated herein by reference in their entirety.

BACKGROUND

Three-dimensional (3D) object detection is used to localize and recognize 3D objects such as pedestrians, vehicles and items from a 3D scene. Currently, 3D object detection plays an important role in many applications such as autonomous driving, robotics manipulation, and augmented reality. In conventional 3D object detection methods, 3D scenes and 3D objects in these scenes are usually described by irregular and sparse point cloud. Therefore, it is difficult to directly apply regular grids-based 2D object detection methods to 3D object detection. In view of this, there is a need for an object detection method for 3D scenes.

SUMMARY

According to implementations of the subject matter described herein, there is provided a solution for 3D object detection. In this solution, feature representations of a plurality of points are extracted from point cloud data related to a 3D object, the feature representation of each point comprising position information and an appearance feature of the point. Initial feature representations of a set of candidate 3D objects are determined based on the feature representations of the plurality of points. The initial feature representation of each candidate 3D object comprises a position feature and an appearance feature of the candidate 3D object. Based on the feature representations of the plurality of points and the initial feature representations of the set of candidate 3D objects, a detection result for the 3D object is generated by determining self-correlations between the set of candidate 3D objects and cross-correlations between the plurality of points and the set of candidate 3D objects. In this way, without grouping points into candidate objects, the solution can localize and recognize the 3D object in a 3D scene only based on correlations between points in the point cloud and candidate 3D objects as well as correlations between the candidate 3D objects.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 illustrates a flowchart of a method for 3D object detection according to some implementations of the subject matter described herein.

Throughout the drawings, the same or similar reference signs refer to the same or similar elements.

DETAILED DESCRIPTION

Figure 1:
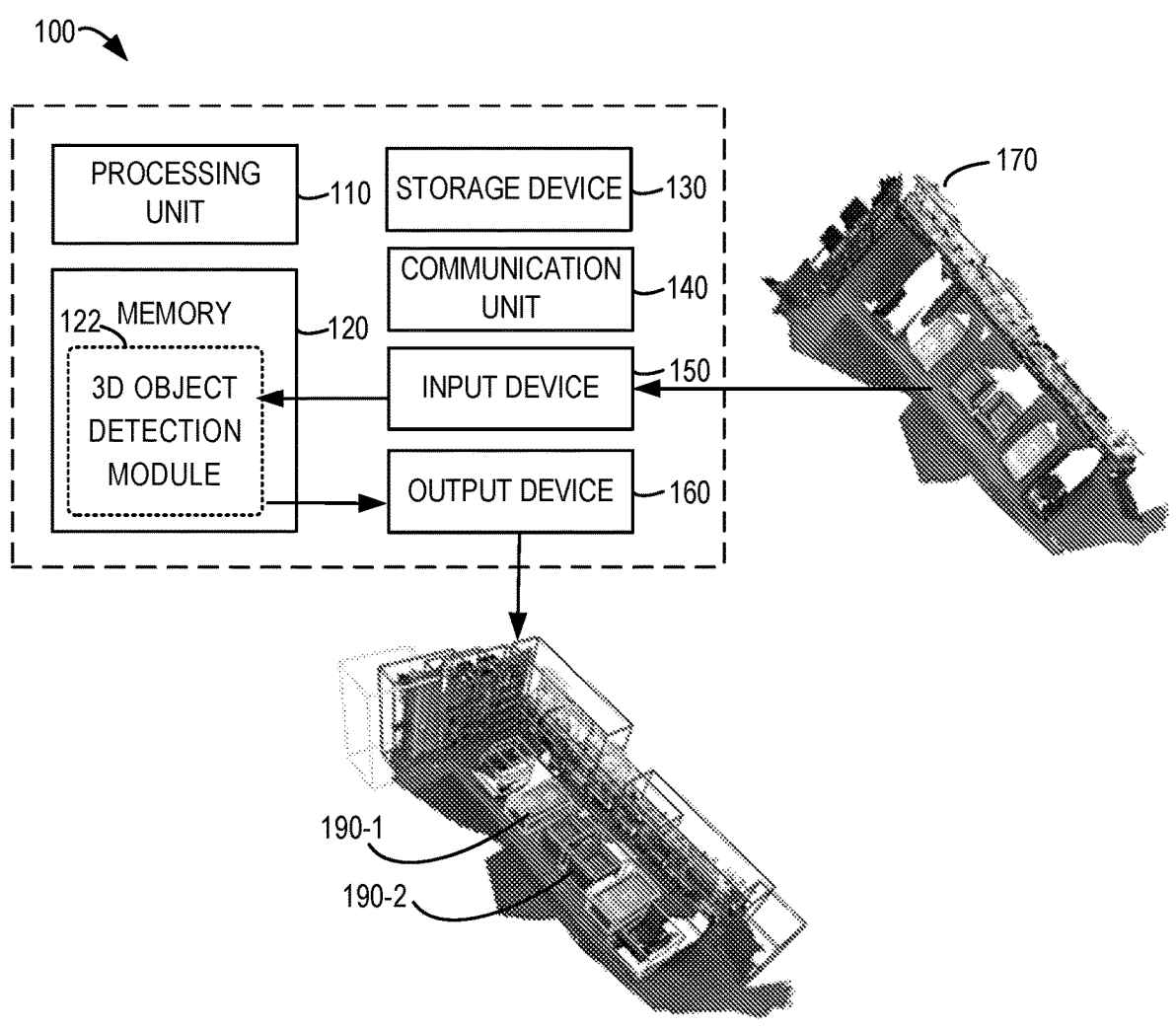
FIG. 1 illustrates a block diagram of a computing device which can implement a plurality of implementations of the subject matter described herein.

The subject matter described herein will now be discussed with reference to several example implementations. It is to be understood these implementations are discussed only for the purpose of enabling persons skilled in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

As used herein, the term "neural network" can handle inputs and provide corresponding outputs and it usually includes an input layer, an output layer and one or more hidden layers between the input and output layers. The neural network used in the deep learning applications usually includes a plurality of hidden layers to extend the depth of the network. Individual layers of the neural network model are connected in sequence, such that an output of a preceding layer is provided as an input for a following layer, where the input layer receives the input of the neural network while the output of the output layer acts as the final output of the neural network. Each layer of the neural network includes one or more nodes (also referred to as processing nodes or neurons) and each node processes the input from the preceding layer. In the text, the terms "neural network," "model," "network" and "neural network model" may be used interchangeably.

As mentioned above, 3D scenes and 3D objects in these scenes are usually described by an irregular and sparse point cloud. Therefore, it is difficult to directly apply regular grids-based 2D object detection methods to 3D object detection. Based thereon, some methods for 3D object detection have been proposed. In conventional 3D object detection methods, usually a point grouping step is required to group specific points in the point cloud into corresponding candidate objects. Then, features of each corresponding candidate object may be computed from points that belong to the candidate object, so that 3D objects are localized and recognized in a 3D scene. However, point grouping is usually implemented with hand-crafted rules. To some extent these hand-crafted rules can describe relationships between points and objects, but the described relationships are not very accurate. Therefore, the detection effect of 3D object detection methods based on hand-crafted rules needs to be further improved. In addition, 3D object detection methods based on point grouping fails to make full use of information which is included in point cloud data.

Discussion has been presented to some problems in conventional 3D object detection solutions. According to implementations of the subject matter described herein, a solution is proposed for 3D object detection, which aims to solve the above problem and one or more of other potential problems. In the solution, feature representations of a plurality of points are extracted from point cloud data related to a 3D object, the feature representation of each point comprising position information and an appearance feature of the point. Initial feature representations of a set of candidate 3D objects are determined based on the feature representations of the plurality of points. The initial feature representation of each candidate 3D object comprises a position feature and an appearance feature of the candidate 3D object. Based on the feature representations of the plurality of points and the initial feature representations of the set of candidate 3D objects, a detection result for the 3D object is generated by determining self-correlations between the set of candidate 3D objects and cross-correlations between the plurality of points and the set of candidate 3D objects. Detailed description is presented below to various example implementations of the solution in conjunction with the drawings.

FIG. 1 illustrates a block diagram of a computing device 100 that can implement a plurality of implementations of the subject matter described herein. It should be understood that the computing device 100 shown in FIG. 1 is only exemplary and shall not constitute any limitation on the functions and scopes of the implementations of the subject matter described herein. As shown in FIG. 1, the computing device 100 includes a computing device 100 in the form of a general purpose computing device. Components of the computing device 100 may include, but is not limited to, one or more processors or processing units 110, a memory 120, a storage device 130, one or more communication units 140, one or more input devices 150, and one or more output devices 160.

In some implementations, the computing device 100 may be implemented as various user terminals or service terminals with computing capability. The service terminals may be servers, large-scale computing devices, and the like provided by a variety of service providers. The user terminal, for example, is a mobile terminal, a fixed terminal or a portable terminal of any type, including a mobile phone, a site, a unit, a device, a multimedia computer, a multimedia tablet, Internet nodes, a communicator, a desktop computer, a laptop computer, a notebook computer, a netbook computer, a tablet computer, a Personal Communication System (PCS) device, a personal navigation device, a Personal Digital Assistant (PDA), an audio/video player, a digital camera/video, a positioning device, a television receiver, a radio broadcast receiver, an electronic book device, a gaming device or any other combination thereof consisting of accessories and peripherals of these devices or any other combination thereof. It may also be predicted that the computing device 100 can support any type of user-specific interface (such as a "wearable" circuit, and the like).

The processing unit 110 may be a physical or virtual processor and may execute various processing based on the programs stored in the memory 120. In a multi-processor system, a plurality of processing units executes computer-executable instructions in parallel to enhance parallel processing capability of the computing device 100. The processing unit 110 can also be known as a central processing unit (CPU), microprocessor, controller and microcontroller.

The computing device 100 usually includes a plurality of computer storage mediums. Such mediums may be any attainable medium accessible by the computing device 100, including but not limited to, a volatile and non-volatile medium, a removable and non-removable medium. The memory 120 may be a volatile memory (e.g., a register, a cache, a Random Access Memory (RAM)), a non-volatile memory (such as, a Read-Only Memory (ROM), an Electrically Erasable Programmable Read-Only Memory (EEPROM), flash), or any combination thereof. The memory 120 may include a 3D object detection module 122, which is configured to perform various functions described herein. The 3D object detection module 122 may be accessed and operated by the processing unit 110 to realize corresponding functions.

The storage device 130 may be a removable or non-removable medium, and may include a machine-readable medium (e.g., a memory, a flash drive, a magnetic disk) or any other medium, which may be used for storing information and/or data and be accessed within the computing device 100. The computing device 100 may further include additional removable/non-removable, volatile/non-volatile storage mediums. Although not shown in FIG. 1, there may be provided a disk drive for reading from or writing into a removable and non-volatile disk and an optical disc drive for reading from or writing into a removable and non-volatile optical disc. In such cases, each drive may be connected to a bus (not shown) via one or more data medium interfaces.

The communication unit 140 implements communication with another computing device via a communication medium. Additionally, functions of components of the computing device 100 may be realized by a single computing cluster or a plurality of computing machines, and these computing machines may communicate through communication connections. Therefore, the computing device 100 may operate in a networked environment using a logic connection to one or more other servers, a Personal Computer (PC) or a further general network node.

The input device 150 may be one or more various input devices, such as a mouse, a keyboard, a trackball, a voice-input device, and the like. The output device 160 may be one or more output devices, e.g., a display, a loudspeaker, a printer, and so on. The computing device 100 may also communicate through the communication unit 140 with one or more external devices (not shown) as required, where the external device, e.g., a storage device, a display device, and so on, communicates with one or more devices that enable users to interact with the computing device 100, or with any device (such as a network card, a modem, and the like) that enable the computing device 100 to communicate with one or more other computing devices. Such communication may be executed via an Input/Output (I/O) interface (not shown).

In some implementations, apart from being integrated on an individual device, some or all of the respective components of the computing device 100 may also be set in the form of a cloud computing architecture. In the cloud computing architecture, these components may be remotely arranged and may cooperate to implement the functions described by the subject matter described herein. In some implementations, the cloud computing provides computation, software, data access and storage services without informing a terminal user of physical locations or configurations of systems or hardware providing such services. In various implementations, the cloud computing provides services via a Wide Area Network (such as Internet) using a suitable protocol. For example, the cloud computing provider provides, via the Wide Area Network, the applications, which can be accessed through a web browser or any other computing component. Software or components of the cloud computing architecture and corresponding data may be stored on a server at a remote location. The computing resources in the cloud computing environment may be merged or spread at a remote datacenter. The cloud computing infrastructure may provide, via a shared datacenter, the services even though they are shown as a single access point for the user. Therefore, components and functions described herein can be provided using the cloud computing architecture from a service provider at a remote location. Alternatively, components and functions may also be provided from a conventional server, or they may be mounted on a client device directly or in other ways.

The computing device 100 may be used for implementing 3D object detection according to various implementations of the subject matter described herein. As shown in FIG. 1, the computing device 100 may receive point cloud data 170 related to a 3D object through the input device 150. The input device 150 may transmit the point cloud data 170 to a 3D object detection module 122. The 3D object detection module 122 generates, from the point cloud data 170 related to the 3D object, a detection result for the 3D object. For example, the detection result for the 3D object may indicate a position feature (for example, position coordinates and a geometric size) and/or other information (for example, the color, shape, category, etc.) of the 3D object, and thus the detection result may be used to localize and recognize the 3D object in 3D scenes. In the example shown in FIG. 1, the 3D object detection module 122 generates the detection result for the 3D object in a living room scene from the point cloud data 170 describing the scene. For example, the detection result may comprise a detection result 190-1 indicating a coffee table and a detection result 190-2 indicating a sofa (referred to as the detection result 190 as a whole). Note only the position feature of the detection result 190 is shown, and the position feature is represented by a bounding box surrounding the 3D object.

Figure 2:
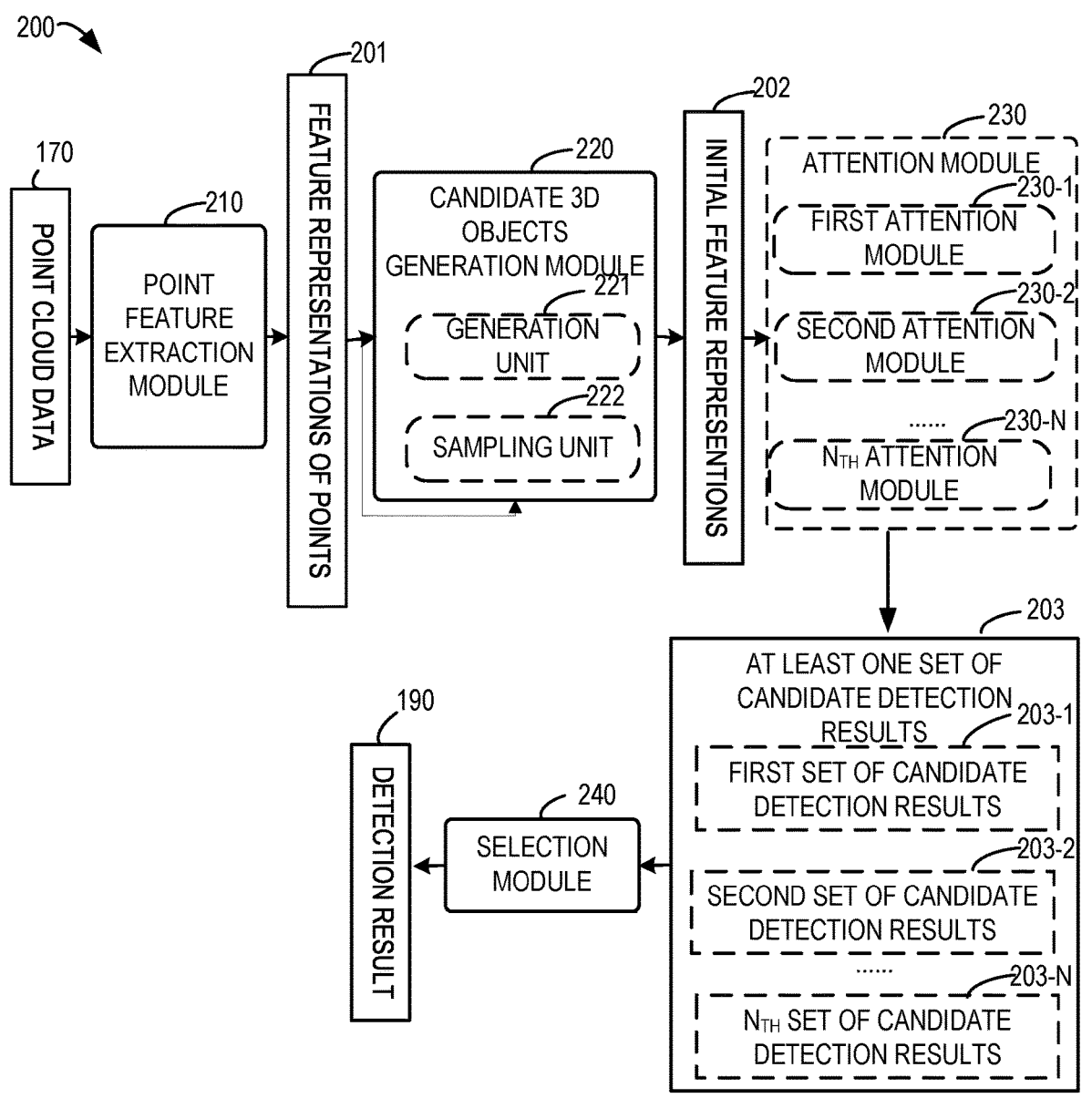
FIG. 2 illustrates an architecture diagram of a system for 3D object detection according to implementations of the subject matter described herein.

FIG. 2 shows an architecture diagram of a system 200 for 3D object detection according to implementations of the subject matter described herein. The system 200 may be implemented in the computing device 100 of FIG. 1. The system 200 may be an end-to-end neural network model. As shown in FIG. 2, the system 200 may comprise a point feature extraction module 210, a candidate 3D objects generation module 220, an attention module 230 and a selection module 240.

The point feature extraction module 210 extracts feature representations 201 of a plurality of points from the received point could data 170. The point cloud data 170 may be a set of vectors used to represent N points in a 3D coordinate system. For example, the vector representing each point may comprise elements indicating 3D coordinates (e.g., x, y, z), color information (e.g., values in RGB color space) or reflection intensity information of the point. Various methods may be used to sample the plurality of points from the point cloud data 170 and extract corresponding feature representations 201 of these points. For example, Point-Net++ architecture may be used to sample M points from the point cloud data 170 related to the N points and extract the feature representations 201 of the M points (N≥M). The feature representations 201 of the M points are a set of vectors used to represent the M points. The feature representation of each point comprises position information and an appearance features of the point. The position information of each point may be the 3D coordinates of the point in the 3D coordinate system. The appearance feature of each point may be generated based on feature transformation of the above 3D coordinates, color information, and reflection intensity information of the point. The appearance feature of each point may further comprise information of a number of adjacent points. The appearance feature of the point may indicate the color and shape of an area containing the point, and/or indicate the category of an object described by at least one point within the area. Therefore, by sampling the plurality of points from the point cloud data 170 and extracting the feature representations 201 of the plurality of points, the data to be input to a subsequent module may be reduced with little information loss, so that computing resources may be saved. The scope of the subject matter described herein is not limited in terms of methods for point feature extraction.

The candidate 3D objects generation module 220 determines initial feature representations 202 of a set of candidate 3D objects based on the feature representations 201 of the plurality of points. The candidate 3D objects generation module 220 may comprise, for example, a generation unit 221 and a sampling unit 222. The generation unit 221 may generate initial detection results for a plurality of candidate 3D objects corresponding to the plurality of points based on the extracted feature representations 201 of the plurality of points. In some implementations, initial detection results for M candidate 3D objects corresponding to the M points may be generated based on the feature representations 201 of the M points by using a fully connected layer. The initial detection result for each candidate 3D object may indicate a position feature (for example, position coordinates and a geometric size) and/or other information (for example, the color, shape, category, etc.) of the candidate 3D object. The position feature of the candidate 3D object may be represented by a bounding box surrounding the candidate 3D object. The bounding box may be a cuboid, cube, ellipsoid, etc. When the position feature of the candidate 3D object is represented by a cuboid-type bounding box, the position feature may be a vector with a dimension of 6×1 and the vector comprises elements indicating the length (l), width (w), height (h) and center point coordinates (x, y, z) of the cuboid. The position feature may indicate the location of the candidate 3D object in the 3D scene, and the geometric size of the candidate 3D object. For each candidate 3D object, the initial feature representation of the candidate 3D object may be generated based on the appearance feature of the corresponding point and the position feature (e.g., position coordinates and the geometric size) in the initial detection result. That is, the initial feature representation of each candidate 3D object may comprise the appearance feature and position feature of the candidate 3D object. As described above, since the appearance feature of a point may indicate the color and shape of an area, which contains the point, and/or the category of an object described by at least one point within the area, the appearance feature of the candidate 3D object may indicate the color, shape and category of the area (i.e., the candidate 3D object) containing the point.

The sampling unit 222 in the candidate 3D objects generation module 220 may determine the initial feature representations 202 of a set of candidate 3D objects based on the initial feature representations of the plurality of candidate 3D objects. The number of the determined initial feature representations 202 of the set of candidate 3D objects is preset and may be adjusted depending on actual applications. Various sampling methods may be used to sample the initial feature representations 202 of the set of (e.g., K, K≤M) candidate 3D objects from the initial feature representations of the plurality of (e.g., M) candidate 3D objects. Examples of sampling methods comprise Farthest Point Sampling (FPS), k-Closet Points Sampling (KPS), KPS with non-maximal suppression (KPS-NMS), etc. In some implementations, a non-maximal suppression algorithm may be directly used to sample the initial feature representations 202 of the set of candidate 3D objects from the initial feature representations of the plurality of candidate 3D objects. In some implementations, other information in the initial detection result may comprise information indicating the category of the candidate 3D object, for example, the probability or score that the candidate 3D object is classified into a specific category. The set of candidate 3D objects may be selected from the plurality of candidate 3D objects corresponding to the plurality of points based on the scores concerning the category in the initial detection results. For example, candidate 3D objects with higher scores may be included in the set of candidate 3D objects, such that the initial feature representations 202 of the set of candidate 3D objects may be determined. In some implementations, by means of sampling, object detection results with higher confidences are retained, and only one of multiple highly similar object detection results (e.g., overlapping bounding boxes) is retained. In this way, the data to be input to a subsequent module may be reduced, so that computing resources may be saved.

Based on the initial feature representations 202 of the set of candidate 3D objects and the feature representations 201 of the plurality of points, the attention module 230 may determine self-correlations between the set of candidate 3D objects and cross-correlations between the plurality of points and the set of candidate 3D objects, thereby generating the detection result 190 for the 3D object. As described above, the detection result 190 may indicate the position feature (for example, position coordinates and a geometric size) and/or other information (for example, the color, shape, category, etc.) of the detected 3D object. The position feature of the 3D object may be represented by a bounding box surrounding the 3D object. The bounding box may be a cuboid, cube, ellipsoid, etc. When the position feature of the candidate 3D object is represented by a cuboid-type bounding box, the position feature may be a vector with a dimension of 6×1 and the vector comprises elements indicating the length (l), width (w), height (h) and center point coordinates (x, y, z) of the cuboid. In some implementations, the detection result 190 may further comprise information indicating the category of the 3D object, for example, the probability or score that the 3D object is classified into a specific category.

Since the correlations between the set of candidate 3D objects as well as the correlations between the plurality of points and candidate 3D objects have been considered, the 3D object indicated by the detection result 190 may be more accurate, i.e., more similar to the actual 3D object. Therefore, with the attention module 230, the 3D object detection method according to implementations of the subject matter described herein may realize higher accuracy of detection without the use of point grouping operation which is commonly used in conventional object detection methods.

In some implementations, the attention module 230 may comprise a number of stacked attention modules 230-1, 230-2 . . . 230-N (collectively or separately referred to as the attention module 230, wherein N≥1). For example, the attention module 230-1 (also referred to as a "first attention module" below) may be used to generate a first set of candidate detection results 203-1, the attention module 230-2 (also referred to as a "second attention module" below) may be used to generate a second set of candidate detection results 203-2 . . . the attention module 230-N may be used to generate an Nth set of candidate detection results 203-N. Details on the use of the attention module 230 to generate the at least one set of candidate detection results 203 will be described with reference to FIG. 3 and FIG. 4.

The selection module 240 may select the detection result 190 from the generated at least one set of candidate detection results 203. In the example shown in FIG. 1, the detection result 190 comprises the detection result 190-1 indicating a coffee table and the detection result 190-2 indicating a sofa. Various methods may be used to select the detection result 190 from the at least one set of candidate detection results 203. Examples of various methods comprise the above non-maximal suppression algorithm. Alternatively or additionally, the detection result 190 may be determined according to the scores concerning the category of the object in candidate detection results. The number of the selected detection results 190 may be adjusted depending on actual applications. It should be understood that the structure and functionality of the system 200 are described only for the purpose of illustration rather than suggesting any limitation on the scope of the subject matter described herein. The subject matter described herein may be implemented in different structures and/or functionality.

Figure 3:
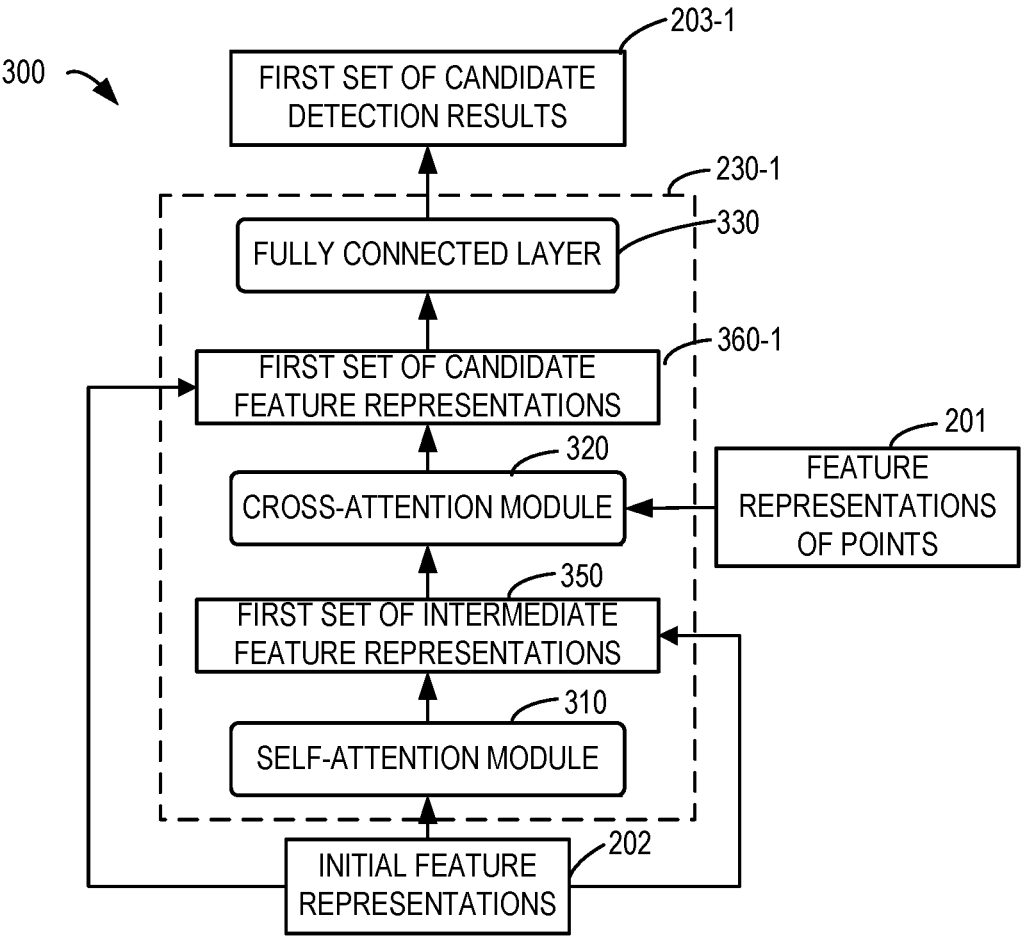
FIG. 3 illustrates a schematic diagram of the process of using a first attention module to generate a first set of candidate detection results according to some implementations of the subject matter described herein.
Figure 4:
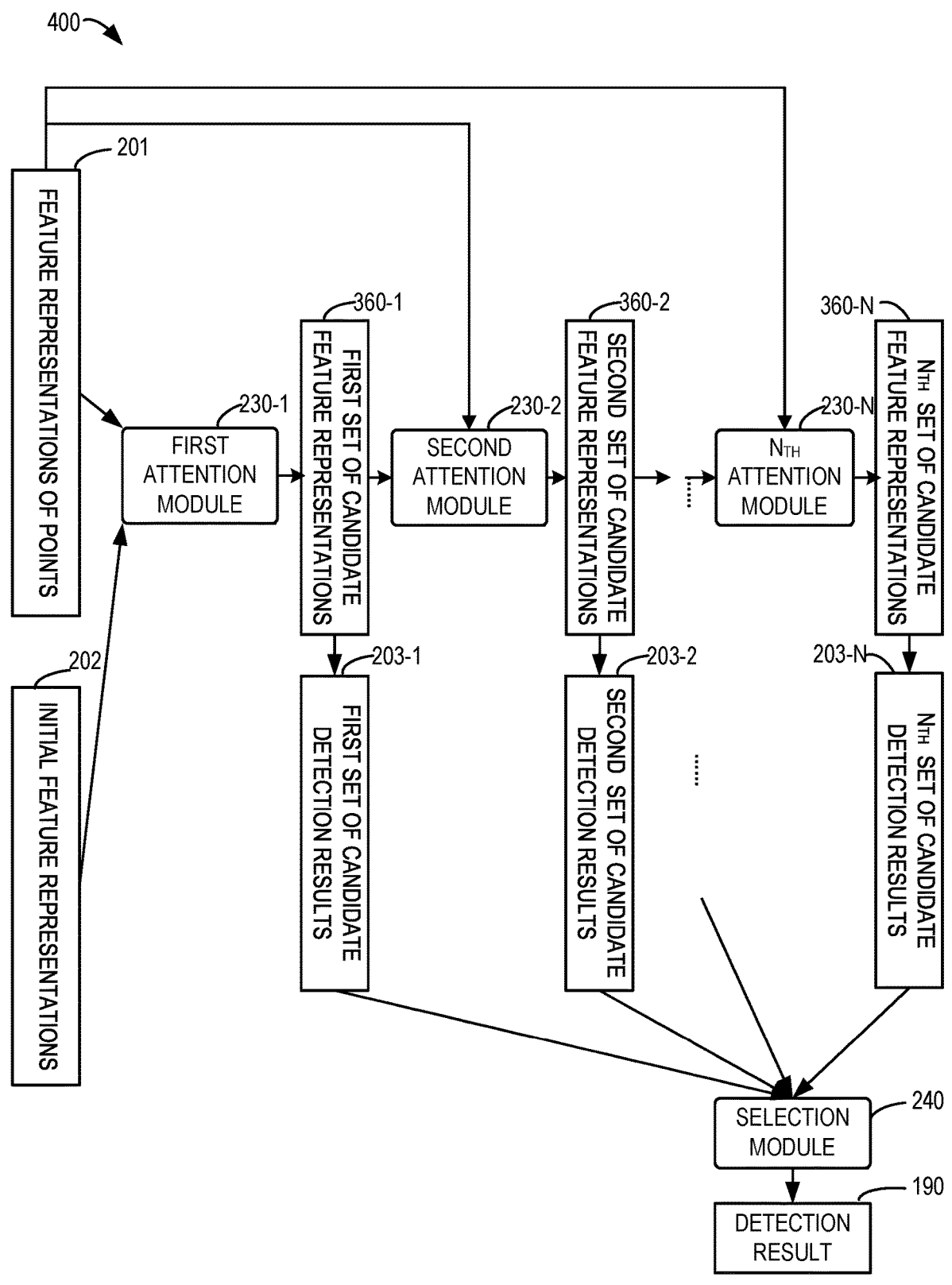
FIG. 4 illustrates a schematic diagram of the process of determining a detection result from at least one set of candidate detection results according to some implementations of the subject matter described herein.

FIG. 3 shows a schematic diagram of generating the first set of candidate detection results 203-1 by using the first attention module 230-1 in the attention module 230 according to implementations of the subject matter described herein. As depicted, the first attention module 230-1 may comprise a self-attention module 310 and a cross-attention module 320.

In some implementations, in order to generate the first set of candidate detection results 203-1, the first attention module 230-1 may receive the initial feature representations 202 of the set of candidate 3D objects. As described above, the initial feature representations 202 of the set of candidate 3D objects may comprise the position features and the appearance features of the candidate 3D objects. In some implementations, a feature transformation may be applied to the position feature of the candidate 3D object, and the transformed position feature are fused with the appearance feature of the candidate 3D object, so that a combined feature representation of the candidate 3D object is generated. For example, the position feature of the candidate 3D object may be encoded as a vector with the same dimensions as the appearance feature, and then the position feature and the appearance feature are vector-added to generate the combined feature representation of the candidate 3D object.

In some implementations, the self-attention module 310 in the first attention module 230-1 may determine the self-correlations between the set of candidate 3D objects based on the initial feature representations 202 of the set of candidate 3D objects. For example, with a self-attention algorithm, self-attention vectors of the set of candidate 3D objects may be calculated to represent the self-correlations between the set of candidate 3D objects. In some implementations, for each of the set of candidate 3D objects, the feature representation o of the candidate 3D object may be multiplied by a query matrix (Q), a key matrix (K) and a value matrix (V) respectively, and thus the feature representation o of the candidate 3D object is mapped into a query vector, a key vector and a value vector respectively. Then, the similarities between the query vector of each candidate 3D object in the set of candidate 3D objects and the key vector of all candidate 3D objects may be determined, and self-attention weights of all candidate 3D objects with respect to a given candidate 3D object may be determined based on the similarities. Finally, self-attention weights of all candidate 3D objects may be multiplied by respective value vectors, and the products are summed up to obtain a self-attention vector of the given candidate 3D object. In this way, the self-attention vector of each candidate 3D object in the set of candidate 3D objects may be obtained, and the self-attention vector is used to measure the correlations between the candidate 3D object and the set of candidate 3D objects. In addition, it should be understood that a multi-head attention algorithm may be used to calculate the self-attention vectors. In the multi-head attention algorithm, each head uses the corresponding query matrix (Q), key matrix (K) and value matrix (V) and produces the corresponding self-attention vectors. Self-attention vectors produced by each head may be summed up to obtain the final self-attention vectors. Specifically, the self-attention vector Self-Att of the candidate 3D object j may be calculated with reference to Formula (1):

$$Self-Att\left(o_j^{(l)}, \{o^{(l)}\}\right) = \sum_{h=1}^{H} W_h^{(l)}\left(\sum_{k=1}^{K} A_{j,k}^{h(l)} \cdot V_h^{(l)} o_k^{(l)}\right) \tag{1}$$

where l indexes the attention module calculating the self-attention vector, j indexes the candidate 3D object of the set of (K) candidate 3D objects, h indexes the head in the multi-head (H) attention algorithm, $o_j^{(l)}$ denotes the feature representation of the candidate 3D object j, $\{o^{(l)}\}$ denotes the feature representations of the set of candidate 3D objects, $A_{j,k}^{h(l)} \propto \exp[(Q_h^{(l)}o_j^{(l)})^T (K_h^{(l)}o_k^{(l)})]$ denotes the self-attention weight of the candidate 3D object k with respect to the candidate 3D object j in the h-th head self-attention calculation of the l-th attention module, $V_h^{(l)}o_k^{(l)}$ denotes the value vector of candidate 3D object k, $W_h^{(l)}$, $Q_h^{(l)}$, $K_h^{(l)}$ and $V_h^{(l)}$ are a multi-head weighting matrix, a query matrix, a key matrix and a value matrix, respectively. These matrixes may be obtained through a training process of a neural network.

In some implementations, in Formula (1), the feature representations $\{o^{(l)}\}$ of the set of candidate 3D objects may be the appearance features in the initial feature representations 202 of the set of candidate 3D objects. Alternatively, the feature representations $\{o^{(l)}\}$ of the set of candidate 3D objects may be the combined feature representations of the set of candidate 3D object. As described above, the combined feature representations may be generated by re-encoding the position feature of the candidate 3D object and adding it to the appearance feature.

In some implementations, the self-attention module 310 may update the initial feature representations 202 of the set of candidate 3D objects to be a first set of intermediate feature representations 350 of the set of candidate 3D objects based on the determined self-correlations. For example, the obtained self-attention vectors Self-Att may be added to the appearance features in the initial feature representations 202 of the set of candidate 3D objects, and thus the first set of intermediate feature representations 350 of the first set of candidate 3D objects may be generated. Additionally, the combined feature representations generated based on the initial feature representations 202 may be added to the first set of intermediate feature representations for updating.

In some implementations, the cross-attention module 320 in the first attention module 230-1 may receive the first set of intermediate feature representations 350 and the feature representations 201 of the plurality of points. As described above, the feature representations 201 of the plurality of points may comprise the position information and appearance features of points. Similarly, the feature transformation may be applied to the position information of the point, and the transformed position feature may be fused with the appearance feature of the point. For example, the position information of the point may be encoded as a vector with the same dimensions as the appearance feature, and the position feature and the appearance feature may be vector-added to generate the combined feature representation of the point.

In some implementations, the cross-attention module 320 may determine the cross-correlations between the set of candidate 3D objects and the plurality of points based on the first set of intermediate feature representations 350 and the feature representations 201 of the plurality of points. Similarly, a cross-attention vector of each of the set of candidate 3D objects with respect to the plurality of points may be calculated with a cross-attention algorithm, and the cross-attention vectors may be used to represent the cross-attentions between the set of candidate 3D objects and the plurality of points. In some implementations, for each of the set of candidate 3D objects, the feature representation o of the candidate 3D object may be multiplied by a query matrix (Q), and thus the feature representation o of the candidate 3D object is mapped into a query vector. By multiplying the feature representation z of each of the plurality of points by a key matrix (K) and a value matrix (V) respectively, the feature representation z of the point may be mapped into a key vector and a value vector respectively. Then, the similarity between the query vector of a given candidate 3D object of the set of candidate 3D objects and the key vector of each point may be determined, and a cross-attention weight of each point with respect to the given candidate 3D object may be determined based on the similarity. Finally, the cross-attention weight of each point may be multiplied by its respective value vector, and the products are summed up to obtain the cross-attention vector of the given candidate 3D object. In this way, the cross-attention vector of each of the set of candidate 3D objects may be obtained, and the cross-attention vector is used to measure the correlations between the candidate 3D object and the plurality of points. Likewise, the cross-attention vectors may be calculated using the multi-head attention algorithm. Specifically, the cross-attention vector Cross-Att of the candidate 3D object j may be calculated with reference to Formula (2):

$$Cross-Att\left(o_j^{(l)}, \{z^{(l)}\}\right) = \sum_{h=1}^{H} W_h^{\prime(l)}\left(\sum_{i=1}^{M} A_{j,i}^{\prime h(l)} \cdot V_h^{\prime(l)} z_i^{(l)}\right) \tag{2}$$

where m indexes the point of the plurality of (i.e., M) points, $\{z^{(l)}\}$ denotes the feature representations of the M points, $A_{j,i}^{\prime h(l)}$ denotes the cross-attention weight of point i with respect to the candidate 3D object j in the h-th head self-attention calculation of the l-th attention module, and $V_h^{\prime(l)}z_i^{(l)}$ denotes the value vector of the point i.

In some implementations, in Formula (2), the feature representations $\{z^{(l)}\}$ of the points may be the appearance features in the feature representations 201 of the points. Alternatively, the feature representations $\{z^{(l)}\}$ of the points may be the combined feature representations of the points. As described above, the combined feature representation may be generated by re-encoding the position feature of the point and then adding it to the appearance feature vector.

In some implementations, the cross-attention module 320 may update the first set of intermediate feature representations 350 to be a first set of candidate feature representations 360-1 of the set of candidate 3D objects based on the determined cross-correlations. For example, the obtained cross-attention vectors may be added to the first set of intermediate feature representations 350 of the set of candidate 3D objects, and thus the first set of candidate feature representations 360-1 of the first set of candidate 3D objects may be generated. Additionally, the combined feature representations generated based on the initial feature representations 202 of the set of candidate 3D objects may be added to the first set of candidate feature representations 360-1 for updating. Additionally, the first set of candidate feature representations 360-1 may be normalized. Similar to the initial feature representations 202, the first set of candidate feature representations 360-1 comprise the position features and appearance features of the set of candidate 3D objects. The position feature may be represented by a bounding box surrounding the 3D object, and the appearance feature may indicate the color, shape and category of the candidate 3D object.

In some implementations, the first attention module 230-1 may generate the first set of candidate detection results 203-1 based on the first set of candidate feature representations 360-1. For example, the first set of candidate detection results 203-1 may be obtained by inputting the first set of candidate feature representations 360-1 into a number of fully connected layers 330 for feature transformation. Additionally, before the number of fully connected layers 330, the first set of candidate feature representations 360-1 may be input into some other fully connected layers for feature transformation to generate the transformed first set of candidate feature representations, and the combined feature representations generated based on the initial feature representations 202 of the set of candidate 3D objects may be added to the transformed first set of candidate feature representations for updating (not shown in FIG. 3). By taking account of the self-correlations between the set of candidate 3D objects and the cross-correlations between the plurality of points and the set of candidate 3D objects, the set of candidate 3D objects indicated by the first set of candidate detection results 203-1 may be more similar to the actual 3D object than the initial detection results for the set of candidate 3D objects. Specifically, with the attention algorithms, points with stronger cross-correlations with a candidate 3D object may be recognized as belonging to the same candidate 3D object without the need of using hand-crafted rules. Therefore, the 3D object detection method according to implementations of the subject matter described herein may realize 3D object detection without the use of the point grouping operation.

The process of using the first attention module 230-1 in the attention module 230 to generate the first set of candidate detection results 203-1 has been described with reference to FIG. 3. Based on the above discussion, detailed description is presented below, with reference to FIG. 4, to the process of using the number of stacked attention modules 230 to generate the at least one set of candidate detection results 203 and determining the detection result 190 from the at least one set of candidate detection results 203. As depicted, the first attention module 230-1 may receive the feature representations 201 of the plurality of points and the initial feature representations 202 of the set of candidate 3D objects. As described with reference to FIG. 3, the first attention module 230-1 may generate the first set of candidate feature representations 360-1 based on the feature representations 201 of the plurality of points and the initial feature representations 202 of the set of candidate 3D objects. The first set of candidate feature representations 360-1 may be provided to the second attention module 230-2.

In some implementations, a self-attention module (not shown here) in the second attention module 230-2 may use the method described with reference to FIG. 3 to determine the self-correlations between the set of candidate 3D objects based on the first set of candidate feature representations 360-1. Similarly, based on the determined self-correlations, the self-attention module in the second attention module 230-2 may update the first set of candidate feature representations 360-1 to be a second set of intermediate feature representations of the set of candidate 3D objects. Then, a cross-attention module in the second attention module 230-2 may determine the cross-correlations between the set of candidate 3D objects and the plurality of points based on the second set of candidate feature representations and the feature representations 201 of the plurality of points. Based on the determined cross-correlations, the cross-attention module in the second attention module 230-2 may update the second of intermediate feature representations to be a second set of candidate feature representations 360-2 of the set of candidate 3D objects. Based on the second set of candidate feature representations 360-2, the second attention module 230-2 may generate the second set of candidate detection results 203-2.

The process of generating the second set of candidate detection results 203-2 is similar to that of generating the first set of candidate detection results 203-1, and thus is not detailed here. Compared with the process of generating the first set of candidate detection results 203-1, when generating the second set of candidate detection results 203-2, the second attention module receives the first set of candidate feature representations 360-1 as input instead of the initial feature representations 202 of the set of candidate 3D objects. Since the first set of candidate feature representations 360-1 is generated based on the initial feature representations 202 as well as the correlations between the set of candidate 3D objects and the plurality of points, by inputting the first set of candidate feature representations 360-1 to the second attention module 230-2, the generated second set of candidate feature representations 360-2 may have more correlation information.

Therefore, when there are N attention modules in the attention modules 230, each attention module may generate a corresponding set of candidate detection results. Unlike the first attention module 230-1 receiving the initial feature representations 202 of the set of candidate 3D objects, each subsequent attention module receives a set of candidate feature representations generated by a preceding attention module as its input. In this way, the correlations (including self-correlations and cross-correlations) between the set of candidate 3D objects and the plurality of points may be accumulated, such that the accuracy of the 3D objects indicated by the generated candidate detection results is increased.

Note although it is usually considered that the subsequent attention module may generate a set of candidate detection results with higher accuracy, in implementations of the subject matter described herein, all sets of candidate detection results generated by the attention modules may be input to the selection module 240 for determination of the detection result 190. In some implementations, a union operation may be performed on at least one set of candidate detection results 203 generated by the at least one attention module 230, and the detection result 190 may be selected from the union. In some implementations, the detection result 190 may also be selected from candidate detection results generated by a part of the attention modules. In some implementations, various methods may be used to select the detection result 190. For example, the non-maximal suppression algorithm may be used to select the detection result 190 from the at least one set of candidate detection results 203. In other implementations, the detection result 190 may be determined according to scores concerning the category of 3D object in candidate detection results.

Working principles of the method for 3D object detection according to implementations of the subject matter described herein have been described in detail with reference to FIGS. 1 to 4. Description is presented below to the training process of the end-to-end neural network model used in the method.

In some implementations, a manually-annotated training dataset for a 3D scene is used to train the neural network in a supervised learning way. The training dataset may comprise a manually-annotated object category, center position and geometric size of a bounding box. The core idea of training the neural network is to cause the 3D object detected by the neural network to have the highest similarity with the actual 3D object, i.e., to minimize the difference between the object category, center position and geometric size of the bounding box detected by the neural network and manually-annotated respective ones. The difference between the detected 3D object and the actual 3D object may be described by a loss function. By adjusting the architecture and parameters of the neural network to minimize the loss function, the optimized network architecture and parameters can be obtained. By applying the neural network with the optimized network architecture and parameters for 3D object detection, a 3D object detection result with higher accuracy may be obtained. Specifically, for the end-to-end neural network model for 3D object detection according to implementations of the subject matter described herein, the loss function may be expressed as:

$$\mathcal{L} = \mathcal{L}_{decoder} + \mathcal{L}_{sampler} \tag{3}$$

where $\mathcal{L}$ denotes the overall loss function, $\mathcal{L}_{decoder}$ denotes the loss function for the attention module 230, and $\mathcal{L}_{sampler}$ denotes the loss function for the candidate 3D objects generation module 220.

As described above, the attention module 230 may be a stack of attention modules. Therefore, as shown by Formula (4), $\mathcal{L}_{decoder}$ may be the average of loss functions for the attention modules.

$$\mathcal{L}_{decoder} = \frac{1}{L} \sum_{l=0}^{L} \mathcal{L}_{decoder}^{(l)} \tag{4}$$

The loss function for each attention module may be calculated from Formula (5).

$$\mathcal{L}_{decoder}^{(l)} = \beta_1 \mathcal{L}_{obj}^{(l)} + \beta_2 \mathcal{L}_{cls}^{(l)} + \beta_3 \mathcal{L}_{center\_off}^{(l)} + \beta_4$$
$$\mathcal{L}_{sz\_cls}^{(l)} + \beta_5 \mathcal{L}_{sz\_off}^{(l)} \tag{5}$$

where $\mathcal{L}_{obj}$ denotes the loss function for the object category, $\mathcal{L}_{cls}$ denotes the loss function for the bounding box classification, $\mathcal{L}_{center\_off}$ denotes the loss function for the bounding box center offset, $\mathcal{L}_{sz\_cls}$ denotes the loss function for the coarse-grained bounding box size, $\mathcal{L}_{sz\_off}$ denotes the loss function for the fine-grained bounding box size, and $\beta_1$ to $\beta_5$ denote corresponding coefficients. In an example implementation, $\beta$ may be set default as 0.5, 0.1, 1.0, 0.1 and 0.3, respectively.

Similarly, the loss function for the candidate 3D objects generation module 220 may also be calculated from Formula (5). As described above, the initial detection results for the set of candidate 3D objects generated by the candidate 3D objects generation module 220 may comprise the position information represented by the bounding box, and information indicating the category of the candidate 3D object. Therefore, the loss function $\mathcal{L}_{sampler}$ for the candidate 3D objects generation module 220 may also be a weighted summation of $\mathcal{L}_{obj}$, $\mathcal{L}_{cls}$, $\mathcal{L}_{center\_off}$, $\mathcal{L}_{sz\_cls}$ and $\mathcal{L}_{sz\_off}$. Alternatively, the initial detection results for the set of candidate 3D objects generated by the candidate 3D objects generation module 220 may only comprise the position information. In this case, the loss function $\mathcal{L}_{sampler}$ for the candidate 3D objects generation module 220 may be a weighted summation of $\mathcal{L}_{cls}$, $\mathcal{L}_{center\_off}$, $\mathcal{L}_{sz\_cls}$ and $\mathcal{L}_{sz\_off}$.

FIG. 5 shows a flowchart of a method 500 for 3D object detection according to some implementations of the subject matter described herein. The method 500 may be implemented by the computing device 100, for example, may be implemented at the 3D object detection module 122 in the memory 120 of the computing device 100.

As shown in FIG. 5, at block 510, the computing device 100 extracts feature representations of a plurality of points from point cloud data related to a 3D object, the feature representation of each point comprising position information and an appearance feature of the point. At block 520, the computing device 100 determines initial feature representations of a set of candidate 3D objects based on the feature representations of the plurality of points, the initial feature representation of each candidate 3D object comprising a position feature and an appearance feature of the candidate 3D object. At block 530, based on the feature representations of the plurality of points and the initial feature representations of the set of candidate 3D objects, the computing device 100 generates a detection result for the 3D object by determining self-correlations between the set of candidate 3D objects and cross-correlations between the plurality of points and the set of candidate 3D objects.

In some implementations, generating a detection result for the 3D object comprises: generating at least one set of candidate detection results for the set of candidate 3D objects by using at least one attention module; and determining the detection result for the 3D object from the at least one set of candidate detection results.

In some implementations, the at least one attention module comprises a first attention module, and generating the at least one set of candidate detection results by using the at least one attention module comprises: generating a first set of candidate detection results of the at least one set of candidate detection results based on the feature representations of the plurality of points and the initial feature representations of the set of candidate 3D objects by using the first attention module.

In some implementations, generating the first set of candidate detection results comprises: determining self-correlation between the set of candidate 3D objects based on the feature representations of the plurality of points and the initial feature representations of the set of candidate 3D objects by using a self-attention module in the first attention module; updating the initial feature representations of the set of candidate 3D objects to be a first set of intermediate feature representations of the set of candidate 3D objects based on the determined self-correlations; determining cross-correlations between the set of candidate 3D objects and the plurality of points based on the first set of intermediate feature representations and the feature representations of the plurality of points by using a cross-attention module in the first attention module; updating the first set of intermediate feature representations to be a first set of candidate feature representations of the set of candidate 3D objects based on the determined cross-correlations; and generating the first set of candidate detection results based on the first set of candidate feature representations.

In some implementations, the at least one attention module further comprises a second attention module, and generating the at least one set of candidate detection results by using the at least one attention module further comprises: generating a second set of candidate detection results of the at least one set of candidate detection results based on the feature representations of the plurality of points and the first set of candidate feature representations by using the second attention module.

In some implementations, generating the second set of candidate detection results comprises: determining self-correlations between the set of candidate 3D objects based on the feature representations of the plurality of points and the first set of candidate feature representations by using a self-attention module in the second attention module; updating the first set of candidate feature representations to be a second set of intermediate feature representations of the set of candidate 3D objects based on the determined self-correlations; determining cross-correlations between the set of candidate 3D objects and the plurality of points based on the second set of intermediate feature representations and the feature representations of the plurality of points by using a cross-attention module in the second attention module; updating the second set of intermediate feature representations to be a second set of candidate feature representations of the set of candidate 3D objects based on the determined cross-correlations; and generating the second set of candidate detection results based on the second set of candidate feature representations.

In some implementations, determining initial feature representations of a set of candidate 3D objects comprises: based on the feature representations of the plurality of points, generating initial feature representations of a plurality of candidate 3D objects corresponding to the plurality of points; and selecting the initial feature representations of the set of candidate 3D objects from the initial feature representations of the plurality of candidate 3D objects.

In some implementations, the detection result indicates at least one of position coordinates, a geometric size, a color, a shape and a category of the 3D object.

As seen from the above description, without grouping points to candidate objects, the 3D object detection method according to implementations of the subject matter described herein can determine the final feature representation of the 3D object only based on the correlations between various points in the point cloud and candidate 3D objects as well as the correlations between the candidate 3D objects, thereby localizing and recognizing the 3D object in the 3D scene.

Some example implementations of the subject matter described herein are listed below.

In one aspect, the subject matter described herein provides a computer-implemented method. The method comprises: extracting, from point cloud data related to a three-dimensional (3D) object, feature representations of a plurality of points, the feature representation of each point comprising position information and an appearance feature of the point; determining, based on the feature representations of the plurality of points, initial feature representations of a set of candidate 3D objects, the initial feature representation of each candidate 3D object comprising a position feature and an appearance feature of the candidate 3D object; and generating a detection result for the 3D object based on the feature representations of the plurality of points and the initial feature representations of the set of candidate 3D objects, by determining self-correlations between the set of candidate 3D objects and cross-correlations between the plurality of points and the set of candidate 3D objects.

In some implementations, generating a detection result for the 3D object comprises: generating at least one set of candidate detection results for the set of candidate 3D objects by using at least one attention module; and determining the detection result for the 3D object from the at least one set of candidate detection results.

In some implementations, the at least one attention module comprises a first attention module, and generating the at least one set of candidate detection results by using the at least one attention module comprises: generating a first set of candidate detection results of the at least one set of candidate detection results based on the feature representations of the plurality of points and the initial feature representations of the set of candidate 3D objects by using the first attention module.

In some implementations, generating the first set of candidate detection results comprises: determining self-correlation between the set of candidate 3D objects based on the feature representations of the plurality of points and the initial feature representations of the set of candidate 3D objects by using a self-attention module in the first attention module; updating the initial feature representations of the set of candidate 3D objects to be a first set of intermediate feature representations of the set of candidate 3D objects based on the determined self-correlations; determining cross-correlations between the set of candidate 3D objects and the plurality of points based on the first set of intermediate feature representations and the feature representations of the plurality of points by using a cross-attention module in the first attention module; updating the first set of intermediate feature representations to be a first set of candidate feature representations of the set of candidate 3D objects based on the determined cross-correlations; and generating the first set of candidate detection results based on the first set of candidate feature representations.

In some implementations, the at least one attention module further comprises a second attention module, and generating the at least one set of candidate detection results by using the at least one attention module further comprises: generating a second set of candidate detection results of the at least one set of candidate detection results based on the feature representations of the plurality of points and the first set of candidate feature representations by using the second attention module.

In some implementations, generating the second set of candidate detection results comprises: determining self-correlations between the set of candidate 3D objects based on the feature representations of the plurality of points and the first set of candidate feature representations by using a self-attention module in the second attention module; updating the first set of candidate feature representations to be a second set of intermediate feature representations of the set of candidate 3D objects based on the determined self-correlations; determining cross-correlations between the set of candidate 3D objects and the plurality of points based on the second set of intermediate feature representations and the feature representations of the plurality of points by using a cross-attention module in the second attention module;

updating the second set of intermediate feature representations to be a second set of candidate feature representations of the set of candidate 3D objects based on the determined cross-correlations; and generating the second set of candidate detection results based on the second set of candidate feature representations.

In some implementations, determining initial feature representations of a set of candidate 3D objects comprises: based on the feature representations of the plurality of points, generating initial feature representations of a plurality of candidate 3D objects corresponding to the plurality of points; and selecting the initial feature representations of the set of candidate 3D objects from the initial feature representations of the plurality of candidate 3D objects.

In some implementations, the detection result indicates at least one of position coordinates, a geometric size, a color, a shape and a category of the 3D object.

In another aspect, the subject matter described herein provides an electronic device. The electronic device comprises: a processing unit; and a memory coupled to the processing unit and comprising instructions stored thereon which, when executed by the processing unit, cause the device to perform acts comprising: extracting, from point cloud data related to a three-dimensional (3D) object, feature representations of a plurality of points, the feature representation of each point comprising position information and an appearance feature of the point; determining, based on the feature representations of the plurality of points, initial feature representations of a set of candidate 3D objects, the initial feature representation of each candidate 3D object comprising a position feature and an appearance feature of the candidate 3D object; and generating a detection result for the 3D object based on the feature representations of the plurality of points and the initial feature representations of the set of candidate 3D objects, by determining self-correlations between the set of candidate 3D objects and cross-correlations between the plurality of points and the set of candidate 3D objects.

In some implementations, generating a detection result for the 3D object comprises: generating at least one set of candidate detection results for the set of candidate 3D objects by using at least one attention module; and determining the detection result for the 3D object from the at least one set of candidate detection results.

In some implementations, the at least one attention module comprises a first attention module, and generating the at least one set of candidate detection results by using the at least one attention module comprises: generating a first set of candidate detection results of the at least one set of candidate detection results based on the feature representations of the plurality of points and the initial feature representations of the set of candidate 3D objects by using the first attention module.

In some implementations, generating the first set of candidate detection results comprises: determining self-correlation between the set of candidate 3D objects based on the feature representations of the plurality of points and the initial feature representations of the set of candidate 3D objects by using a self-attention module in the first attention module; updating the initial feature representations of the set of candidate 3D objects to be a first set of intermediate feature representations of the set of candidate 3D objects based on the determined self-correlations; determining cross-correlations between the set of candidate 3D objects and the plurality of points based on the first set of intermediate feature representations and the feature representations of the plurality of points by using a cross-attention module in the first attention module; updating the first set of intermediate feature representations to be a first set of candidate feature representations of the set of candidate 3D objects based on the determined cross-correlations; and generating the first set of candidate detection results based on the first set of candidate feature representations.

In some implementations, the at least one attention module further comprises a second attention module, and generating the at least one set of candidate detection results by using the at least one attention module further comprises: generating a second set of candidate detection results of the at least one set of candidate detection results based on the feature representations of the plurality of points and the first set of candidate feature representations by using the second attention module.

In some implementations, generating the second set of candidate detection results comprises: determining self-correlations between the set of candidate 3D objects based on the feature representations of the plurality of points and the first set of candidate feature representations by using a self-attention module in the second attention module; updating the first set of candidate feature representations to be a second set of intermediate feature representations of the set of candidate 3D objects based on the determined self-correlations; determining cross-correlations between the set of candidate 3D objects and the plurality of points based on the second set of intermediate feature representations and the feature representations of the plurality of points by using a cross-attention module in the second attention module; updating the second set of intermediate feature representations to be a second set of candidate feature representations of the set of candidate 3D objects based on the determined cross-correlations; and generating the second set of candidate detection results based on the second set of candidate feature representations.

In some implementations, determining initial feature representations of a set of candidate 3D objects comprises: based on the feature representations of the plurality of points, generating initial feature representations of a plurality of candidate 3D objects corresponding to the plurality of points; and selecting the initial feature representations of the set of candidate 3D objects from the initial feature representations of the plurality of candidate 3D objects.

In some implementations, the detection result indicates at least one of position coordinates, a geometric size, a color, a shape and a category of the 3D object.

In a further aspect, the subject matter described herein provides a computer program product being tangibly stored in a non-transitory computer storage medium and comprising machine-executable instructions which, when executed by a device, causing the device to perform the method of the above aspect.

In a further aspect, the subject matter described herein provides a computer program product including machine-executable instructions which, when executed by a device, cause the device to perform the method of the above aspect.

In a further aspect, the subject matter described herein provides a computer-readable medium having machine-executable instructions stored thereon which, when executed by a device, cause the device to perform the method of the above aspect.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, a special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or a server.

In the context of this subject matter described herein, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the particular order shown or in a sequential order, or all operations shown are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
extracting, from point cloud data related to a three-dimensional (3D) object, feature representations of a plurality of points, the feature representation of each point comprising position information and an appearance feature of the point;
determining, based on the feature representations of the plurality of points, initial feature representations of a set of candidate 3D objects, the initial feature representation of each candidate 3D object comprising a position feature and an appearance feature of the candidate 3D object; and
generating a detection result for the 3D object based on the feature representations of the plurality of points and the initial feature representations of the set of candidate 3D objects, by determining self-correlations between the set of candidate 3D objects and cross-correlations between the plurality of points and the set of candidate 3D objects, wherein generating a detection result for the 3D object comprises:
generating at least one set of candidate detection results for the set of candidate 3D objects by using at least one attention module, wherein the at least one attention module comprises a first attention module, and generating the at least one set of candidate detection results by using the at least one attention module comprises:
generating a first set of candidate detection results of the at least one set of candidate detection results based on the feature representations of the plurality of points and the initial feature representations of the set of candidate 3D objects by using the first attention module; and
determining the detection result for the 3D object from the at least one set of candidate detection results.

2. The method of claim 1, wherein determining initial feature representations of a set of candidate 3D objects comprises:
generating, based on the feature representations of the plurality of points, initial feature representations of a plurality of candidate 3D objects corresponding to the plurality of points; and
selecting the initial feature representations of the set of candidate 3D objects from the initial feature representations of the plurality of candidate 3D objects.

3. The method of claim 1, wherein the detection result indicates at least one of the following: position coordinates, a geometric size, a color, a shape, and a category of the 3D object.

4. The method of claim 1, wherein generating the first set of candidate detection results comprises:
determining self-correlations between the set of candidate 3D objects based on the feature representations of the plurality of points and the initial feature representations of the set of candidate 3D objects by using a self-attention module in the first attention module;
updating, based on the determined self-correlations, the initial feature representations of the set of candidate 3D objects to be a first set of intermediate feature representations of the set of candidate 3D objects;
determining cross-correlations between the set of candidate 3D objects and the plurality of points based on the first set of intermediate feature representations and the feature representations of the plurality of points by using a cross-attention module in the first attention module;
updating, based on the determined cross-correlations, the first set of intermediate feature representations to be a first set of candidate feature representations of the set of candidate 3D objects; and
generating the first set of candidate detection results based on the first set of candidate feature representations.

5. The method of claim 1, wherein the at least one attention module further comprises a second attention module, and generating the at least one set of candidate detection results by using the at least one attention module further comprises:

generating a second set of candidate detection results of the at least one set of candidate detection results based on the feature representations of the plurality of points and the first set of candidate feature representations by using the second attention module.

6. The method of claim 5, wherein generating the second set of candidate detection results comprises:

determining self-correlations between the set of candidate 3D objects based on the feature representations of the plurality of points and the first set of candidate feature representations by using a self-attention module in the second attention module;

updating, based on the determined self-correlations, the first set of candidate feature representations to be a second set of intermediate feature representations of the set of candidate 3D objects;

determining cross-correlations between the set of candidate 3D objects and the plurality of points based on the second set of intermediate feature representations and the feature representations of the plurality of points by using a cross-attention module in the second attention module;

updating, based on the determined cross-correlations, the second set of intermediate feature representations to be a second set of candidate feature representations of the set of candidate 3D objects; and generating the second set of candidate detection results based on the second set of candidate feature representations.

7. An electronic device, comprising:

a processing unit; and a memory coupled to the processing unit and comprising instructions stored thereon which, when executed by the processing unit, cause the device to perform acts comprising:

extracting, from point cloud data related to a three-dimensional (3D) object, feature representations of a plurality of points, the feature representation of each point comprising position information and an appearance feature of the point;

determining, based on the feature representations of the plurality of points, initial feature representations of a set of candidate 3D objects, the initial feature representation of each candidate 3D object comprising a position feature and an appearance feature of the candidate 3D object, wherein generating a detection result for the 3D object comprises:

generating at least one set of candidate detection results for the set of candidate 3D objects by using at least one attention module, wherein the at least one attention module comprises a first attention module, and generating the at least one set of candidate detection results by using the at least one attention module comprises:

generating a first set of candidate detection results of the at least one set of candidate detection results based on the feature representations of the plurality of points and the initial feature representations of the set of candidate 3D objects by using the first attention module; and determining the detection result for the 3D object from the at least one set of candidate detection results; and generating a detection result for the 3D object based on the feature representations of the plurality of points and the initial feature representations of the set of candidate 3D objects, by determining self-correlations between the set of candidate 3D objects and cross-correlations between the plurality of points and the set of candidate 3D objects.

8. The device of claim 7, wherein determining initial feature representations of a set of candidate 3D objects comprises:

generating, based on the feature representations of the plurality of points, initial feature representations of a plurality of candidate 3D objects corresponding to the plurality of points; and selecting the initial feature representations of the set of candidate 3D objects from the initial feature representations of the plurality of candidate 3D objects.

9. The device of claim 7, wherein the detection result indicates at least one of the following: position coordinates, a geometric size, a color, a shape, and a category of the 3D object.

10. The device of claim 7, wherein generating the first set of candidate detection results comprises:

determining self-correlations between the set of candidate 3D objects based on the feature representations of the plurality of points and the initial feature representations of the set of candidate 3D objects by using a self-attention module in the first attention module;

updating, based on the determined self-correlations, the initial feature representations of the set of candidate 3D objects to be a first set of intermediate feature representations of the set of candidate 3D objects;

determining cross-correlations between the set of candidate 3D objects and the plurality of points based on the first set of intermediate feature representations and the feature representations of the plurality of points by using a cross-attention module in the first attention module;

updating, based on the determined cross-correlations, the first set of intermediate feature representations to be a first set of candidate feature representations of the set of candidate 3D objects; and generating the first set of candidate detection results based on the first set of candidate feature representations.

11. A computer program product comprising machine-executable instructions which, when executed by a device, cause the device to perform acts comprising:

extracting, from point cloud data related to a three-dimensional (3D) object, feature representations of a plurality of points, the feature representation of each point comprising position information and an appearance feature of the point;

determining, based on the feature representations of the plurality of points, initial feature representations of a set of candidate 3D objects, the initial feature representation of each candidate 3D object comprising a position feature and an appearance feature of the candidate 3D object; and generating a detection result for the 3D object based on the feature representations of the plurality of points and the initial feature representations of the set of candidate 3D objects, by determining self-correlations between the set of candidate 3D objects and cross-correlations between the plurality of points and the set of candidate 3D objects, wherein generating a detection result for the 3D object comprises:

generating at least one set of candidate detection results for the set of candidate 3D objects by using at least one attention module, wherein the at least one attention module comprises a first attention module, and generating the at least one set of candidate detection results by using the at least one attention module comprises:

generating a first set of candidate detection results of the at least one set of candidate detection results based on the feature representations of the plurality of points and the initial feature representations of the set of candidate 3D objects by using the first attention module; and determining the detection result for the 3D object from the at least one set of candidate detection results.

* * * * *